US011131339B1

(12) United States Patent
Elbibary et al.

(10) Patent No.: US 11,131,339 B1
(45) Date of Patent: Sep. 28, 2021

(54) HIGH PERFORMANCE AIR JOURNAL BEARING

(71) Applicant: The Boeing Company, Chicago, IL (US)

(72) Inventors: Mohamed Elbibary, Lynnwood, WA (US); Zachary G. Brown, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/808,771

(22) Filed: Mar. 4, 2020

(51) Int. Cl.
*F16C 17/02* (2006.01)
*F16C 43/02* (2006.01)
*B22F 10/00* (2021.01)
*B33Y 80/00* (2015.01)

(52) U.S. Cl.
CPC ............ *F16C 17/024* (2013.01); *B22F 10/00* (2021.01); *F16C 43/02* (2013.01); *B33Y 80/00* (2014.12); *F16C 2206/06* (2013.01); *F16C 2206/40* (2013.01); *F16C 2360/24* (2013.01); *Y10T 29/49636* (2015.01); *Y10T 29/49696* (2015.01)

(58) Field of Classification Search
CPC .... F16C 17/024; F16C 25/04; F16C 33/1005; F16C 33/1085; F16C 43/02; B22F 10/00; B33Y 80/00; Y10T 29/49626; Y10T 29/49696
USPC .................. 384/103, 105–106, 306, 114, 117
See application file for complete search history.

(56) References Cited

U.S. PATENT DOCUMENTS

| 3,795,427 | A | * | 3/1974 | Licht | F16C 17/024 384/103 |
| 3,809,443 | A | * | 5/1974 | Cherubim | F16C 17/10 384/106 |
| 4,222,618 | A | * | 9/1980 | Miller, Jr. | F16C 17/024 384/202 |
| 4,475,824 | A | * | 10/1984 | Glaser | F16C 17/024 384/106 |
| 4,549,821 | A | * | 10/1985 | Kawakami | F16C 17/024 384/103 |
| 4,699,523 | A | * | 10/1987 | Hagemeister | F16C 43/02 384/103 |
| 7,056,025 | B2 | * | 6/2006 | Nakata | F16C 17/024 384/103 |
| 8,360,645 | B2 | * | 1/2013 | Omori | F16C 17/024 384/106 |
| 8,371,799 | B2 | * | 2/2013 | Spathias | F04D 29/056 415/1 |
| 8,419,283 | B2 | | 4/2013 | McAuliffe et al. | |
| 9,028,149 | B2 | * | 5/2015 | Rosen | F16C 17/024 384/106 |

(Continued)

*Primary Examiner* — Marcus Charles
(74) *Attorney, Agent, or Firm* — Quinn IP Law

(57) ABSTRACT

An air journal bearing for a rotatable shaft of a turbomachine includes a journal sleeve having an inner cylindrical surface and a central axis defining longitudinal and radial directions, a top foil disposed radially inboard of the journal sleeve and configured to receive the rotatable shaft, and a bump foil disposed between the top foil and the journal sleeve and configured to bias at least a portion of the top foil against an outer surface of the rotatable shaft. At least one of the bump foil and a radially extending segment of the top foil is formed contiguous with the inner cylindrical surface. The journal sleeve, the top foil and the bump foil may be formed as a single piece made of selectively sintered ceramic-metal powder.

19 Claims, 7 Drawing Sheets

(56) References Cited

U.S. PATENT DOCUMENTS

| | | | |
|---|---|---|---|
| 9,109,622 B2* | 8/2015 | Meacham | F16C 17/024 |
| 9,222,509 B2* | 12/2015 | Swanson | F16F 1/028 |
| 9,429,191 B2* | 8/2016 | Ertas | F16C 32/0666 |
| 9,732,789 B2* | 8/2017 | McAuliffe | F16C 37/002 |
| 9,989,085 B2* | 6/2018 | Saville | F16C 43/02 |
| 10,072,702 B2* | 9/2018 | Dahinten | F16C 43/02 |
| 2015/0362012 A1* | 12/2015 | Ermilov | F16C 33/1015 |
| | | | 384/105 |
| 2019/0036384 A1* | 1/2019 | Faulhaber | H02K 1/278 |

* cited by examiner

HIGH PERFORMANCE AIR JOURNAL BEARING

INTRODUCTION

This disclosure relates generally to air journal bearings and methods of manufacturing air journal bearings.

Air journal bearings (also known as hydrodynamic fluid film journal bearings or foil bearings) are used to support rotatable components, such as shafts for air cycle machines, cabin air compressors, ram air fans and the like. In typical use, the rotatable shaft is inserted through an annular journal sleeve, where the outer diameter of the rotatable shaft is slightly smaller than the inner diameter of the annular journal sleeve. This difference in diameters provides a circumferential gap between the shaft and the journal sleeve, and within this gap a top foil, an intermediate foil and a bump foil are received. Among the three foils, the top foil is disposed most inward radially and the bump foil is disposed most outward radially, with the intermediate foil disposed therebetween.

In some configurations, the top and intermediate foils may be formed as a single piece (e.g., from a thin sheet of metal) which may be wrapped upon itself such that the two foils overlap each other. In this arrangement, the top foil hugs the intermediate foil with little or no gaps therebetween. The bump foil may be formed as a separate piece from the top foil/intermediate foil piece, with an undulating or wavelike shape such that the bump foil may be used as a wave spring to urge or bias the top and intermediate foils radially inward (i.e., away from the inner surface of the journal sleeve and toward the outer surface of the rotatable shaft). This arrangement also provides longitudinally extending channels between the intermediate foil and the bump foil, as well as between the bump foil and the inner surface of the journal sleeve.

Some air journal bearings include a radially extending key formed as part of the foil assembly, with the key being received within a slot formed in the journal sleeve. This formed key makes contact with the edges of the slot to prevent or limit rotation of the foils relative to the journal sleeve. Thus, when the shaft rotates, the foils do not rotate along with it.

Air journal bearings utilize a fluid, such as air, to support the shaft during rotation. When the shaft rotates, the fluid supporting the shaft is pressurized, such that there is little or no contact between the top foil and the surface of the rotating shaft. The fluid which supports the shaft during rotation may communicate with the longitudinally extending channels through apertures formed through the top and intermediate foils, as well as through gaps around the formed key.

Currently known air journal bearings of the type described above require forming a slot in the journal sleeve, such as by machining. And during assembly, the foils must be manipulated and oriented so that the formed key fits appropriately within the slot.

SUMMARY

According to one embodiment, an air journal bearing for a rotatable shaft of a turbomachine includes a journal sleeve having an inner cylindrical surface and a central axis defining longitudinal and radial directions, a top foil disposed radially inboard of the journal sleeve and configured to receive the rotatable shaft, and a bump foil disposed between the top foil and the journal sleeve. The bump foil is configured to bias at least a portion of the top foil against an outer surface of the rotatable shaft, and at least one of the bump foil and a radially extending segment of the top foil is formed contiguous with the inner cylindrical surface.

The journal sleeve, the top foil and the bump foil may be formed as a single piece by additive manufacturing, which may include selective laser sintering. For example, the journal sleeve, the top foil and the bump foil may be made of selectively sintered ceramic-metal powder. Alternatively, the journal sleeve, the top foil and the bump foil may be made of carbon fiber. The top foil and the bump foil may be constrained against rotation with respect to the journal sleeve, and the top foil may be contiguous with the bump foil at at least one location on the top foil.

The top foil and the bump foil may define a plurality of first longitudinal channels therebetween, and the bump foil and the inner cylindrical surface may define a plurality of second longitudinal channels therebetween. Additionally, both the bump foil and the radially extending segment of the top foil may be formed contiguous with the inner cylindrical surface. Further, each of the top foil and the bump foil may extend substantially along an entirety of the circumference of the inner cylindrical surface.

According to another embodiment, an air journal bearing for a rotatable shaft of an air handling machine includes: (i) a journal sleeve having an inner cylindrical surface and a central axis defining longitudinal and radial directions; (ii) a top foil disposed radially inboard of the journal sleeve and configured to receive the rotatable shaft; and (iii) a bump foil disposed between the top foil and the journal sleeve and configured to bias at least a portion of the top foil against an outer surface of the rotatable shaft. In this embodiment, the journal sleeve, the top foil and the bump foil are formed as a single piece made of selectively sintered ceramic-metal powder, wherein at least one of the bump foil and a radially extending segment of the top foil is formed contiguous with the inner cylindrical surface.

As with the previous embodiment, in this embodiment the top foil and the bump foil may be constrained against rotation with respect to the journal sleeve, and the top foil may be contiguous with the bump foil at at least one location on the top foil. Likewise, the top and bump foils may define a plurality of first longitudinal channels therebetween, and the bump foil and the inner cylindrical surface may define a plurality of second longitudinal channels therebetween. Similarly, the bump foil and the radially extending segment of the top foil may be formed contiguous with the inner cylindrical surface, and the top and bump foils may extend substantially along an entirety of the circumference of the inner cylindrical surface.

According to yet another embodiment, a method of manufacturing a one-piece air journal bearing for a rotatable shaft of a turbomachine includes: (i) presenting a plurality of successive deposition layers of a ceramic-metal powder comprising a mixture of ceramic powder and metal powder, wherein the ceramic and metal powders are sinterable by absorption of laser energy at first and second wavelengths, respectively; and (ii) after the presenting of each deposition layer, laser scanning a respective pattern on each deposition layer, using a respective combination of the first and second wavelengths, to produce a respective product layer of the one-piece air journal bearing made of selectively sintered ceramic and/or metal and corresponding to the respective pattern. An accumulation of the respective product layers produces the one-piece air journal bearing which comprises: a journal sleeve having an inner cylindrical surface, a top foil disposed radially inboard of the journal sleeve and configured to receive the rotatable shaft, and a bump foil disposed between the top foil and the journal sleeve and configured to bias at least a portion of the top foil against an outer surface of the rotatable shaft, wherein at least one of the bump foil and a radially extending segment of the top foil is formed contiguous with the inner cylindrical surface.

In this method, the ceramic-metal powder may include a buffer powder having a melting point higher than respective melting points of the ceramic powder and the metal powder. The laser scanning may utilize the first wavelength at respective first portions of each respective pattern to sinter the ceramic powder thereat and the second wavelength at respective second portions of each respective pattern to sinter the metal powder thereat. As produced by this method, a ratio of sintered ceramic to sintered metal per unit volume may vary radially for at least one of the journal sleeve, the top foil and the bump foil.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

Note that some of the drawings herein are presented in multiple related views, with the related views sharing a common Arabic numeral portion of the figure number and each individual view having its own unique "alphabetic" portion of the figure number. For example, FIGS. 2A, 2B and 2C are front, cross-sectional side and perspective views, respectively, of a journal sleeve; these related views share the same Arabic numeral (i.e., 2), but each individual view has its own unique "alphabetic" designation (i.e., A, B or C). When drawings are numbered in this way, reference may be made herein to the Arabic number alone to refer collectively to all the associated "alphabetics"; thus, "FIG. 2" refers to FIGS. 2A through 2C collectively, and "FIG. 11" refers to FIGS. 11A and 11B collectively.

DETAILED DESCRIPTION

Figure 1:
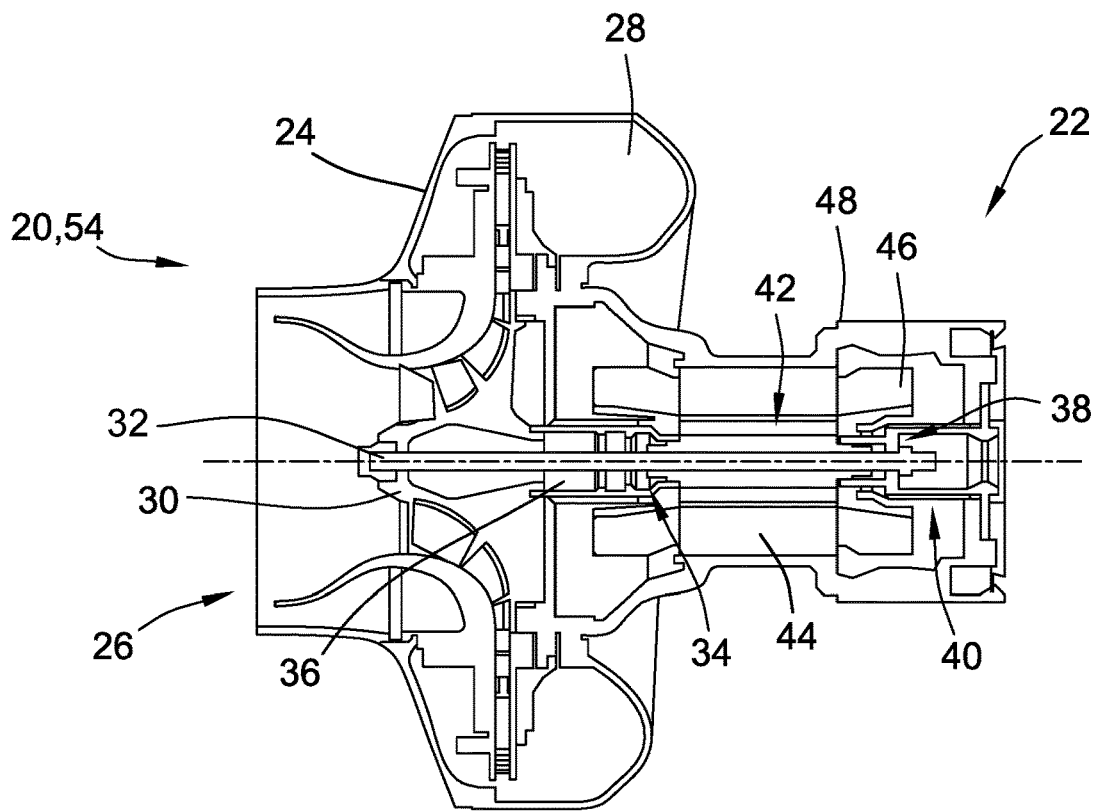
FIG. 1 is a cross-sectional side view of a turbomachine utilizing air journal bearings.

Referring now to the drawings, wherein like numerals indicate like parts in the several views, an air journal bearing 50 for a rotatable shaft 52 of a turbomachine 20, 54, and a method 100 of manufacturing a one-piece air journal bearing 50, 240 for a rotatable shaft 52 of a turbomachine 20, 54, are shown and described herein. The turbomachine 20, 54 may be an air cycle machine, a cabin air compressor, a ram air fan and any other type of air handling or fluid handling machine.

FIG. 1 shows a cross-sectional view of a compressor 20 as an exemplary type of turbomachine 54. The compressor 20 includes an electric motor 22 and a compressor housing 24 having a compressor inlet 26 and a compressor outlet 28. A compressor rotor or impeller 30 is connected by a tie bolt 32 to a forward shaft 34, with the forward shaft 34 being received within a forward air journal bearing 36. The forward shaft 34 is connected to an aft shaft 38 (received within an aft air journal bearing 40) by means of a motor shaft assembly 42 which couples the forward and aft shafts 34, 38 together and serves as a rotor. The compressor 20 further includes a lamination stack 44 (serving as a stator) and stator end turns/windings 46, enclosed along with the other electric motor components in a motor housing 48. Thus, the compressor 20 illustrated here contains two separate air journal bearings 36, 40—one supporting the forward shaft 34 and another supporting the aft shaft 38.

Figure 2A:
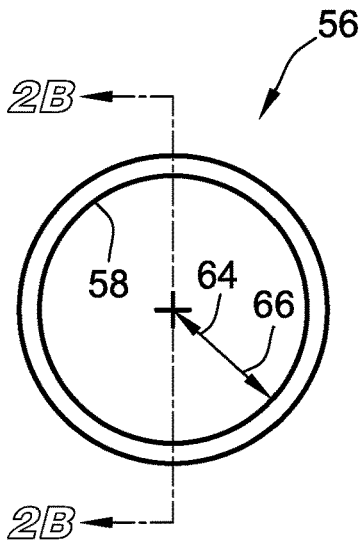
FIGS. 2A, 2B and 2C are front, cross-sectional side and perspective views, respectively, of a journal sleeve of an air journal bearing.
Figure 2B:
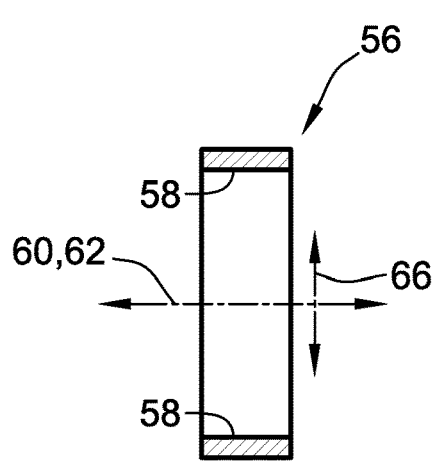
Figure 2C:
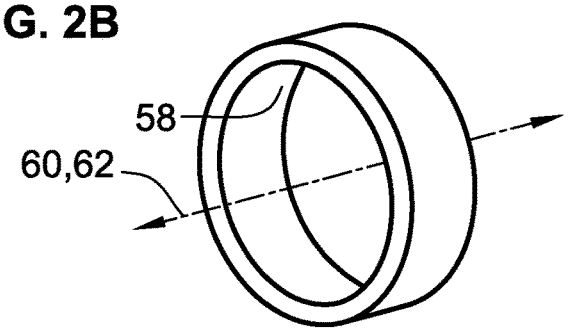

FIGS. 2A, 2B and 2C show front, cross-sectional side and perspective views, respectively, of a journal sleeve 56 portion of an air journal bearing 50 according to the present disclosure. (Note that while the air journal bearing 50 disclosed herein includes a journal sleeve 56, top foil 68 and bump foil 74 that are formed as a single piece, FIG. 2 only shows the journal sleeve 56 portion in order to facilitate the description of certain axes, directions and other features.) The journal sleeve 56 is an annulus having an inner cylindrical surface 58 and a central longitudinal axis 60 which defines a longitudinal direction 62, an inward radial direction 64 and an outward radial direction 66. These directions 62, 64, 66 are used throughout the present disclosure to describe various orientations and relationships between/among certain elements.

Figure 3:
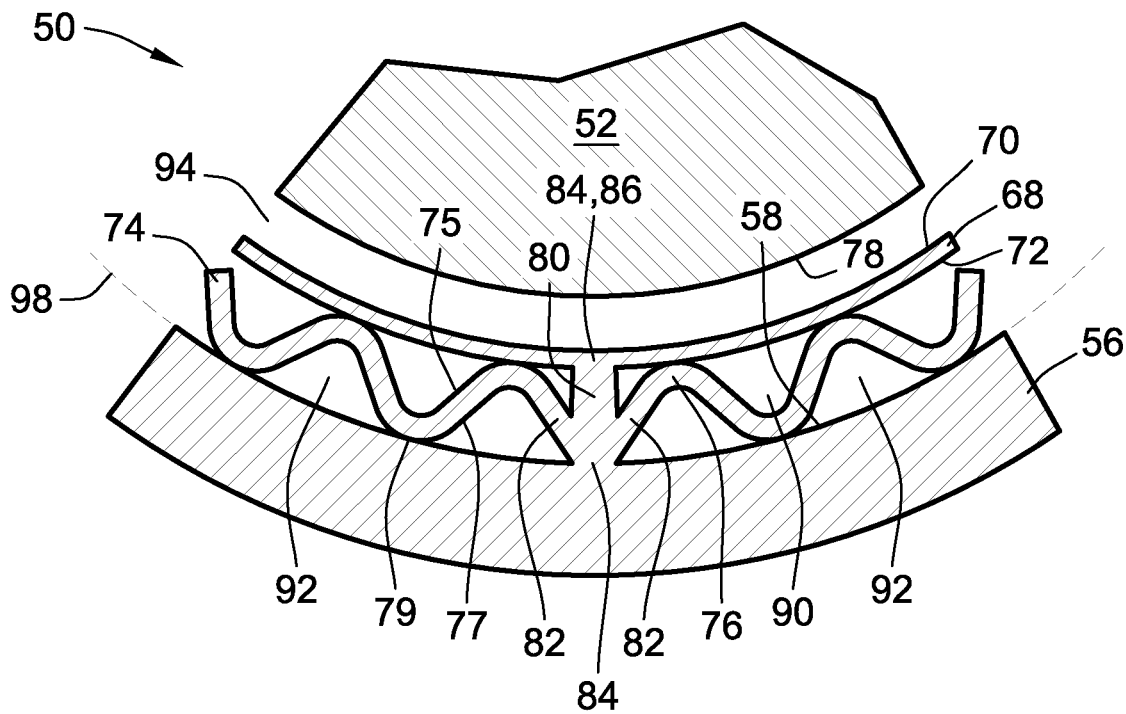
FIG. 3-8 are partial cross-sectional views of various configurations of an air journal bearing supporting a rotatable shaft.

FIG. 3 shows a partial cross-sectional view of one configuration of an air journal bearing 50 for supporting a rotatable shaft 52 of a turbomachine 54 (such as the type shown in FIG. 1) according to the present disclosure. It includes a journal sleeve 56 having an inner cylindrical surface 58 and a central axis 60 (shown in FIG. 2 but not shown here) defining longitudinal and radial directions 62, 64, 66. A top foil 68 is disposed radially inboard of the journal sleeve 56 and is configured to receive the rotatable shaft 52. The top foil 68 has opposed top and bottom surfaces 70, 72 with the top surface 70 generally conforming to the outer surface 78 of the rotatable shaft 52 and with a circumferential gap 94 defined between the top surface 70 and the outer surface 78. A bump foil 74 having top and bottom surfaces 75, 77 is disposed between the top foil 68 and the journal sleeve 56. The bump foil 74 may have an undulating or wavelike shape and is configured to bias at least a portion of the top foil 68 (e.g., the top surface 70 along some length of the top foil 68) against the outer surface 78 of the rotatable shaft 52. The bump foil 74 may have a plurality of radially inward extending crests 76 and a plurality of radially outward extending crests 79.

Figure 9:
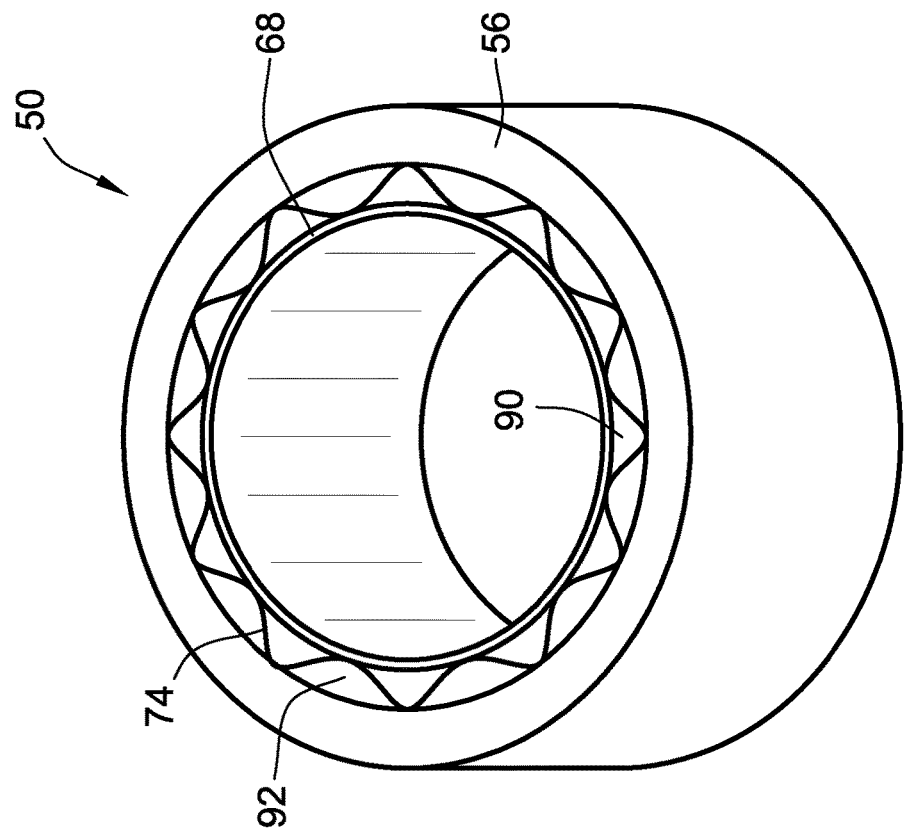
FIG. 9 is a perspective view of the air journal bearing of FIG. 3.

The top foil 68 and the bump foil 74 may define a plurality of first longitudinal channels 90 therebetween, and the bump foil 74 and the inner cylindrical surface 58 may define a plurality of second longitudinal channels 92 therebetween. Additional apertures (not shown) may be defined in the bottom foil 74 so that the pressurized fluid may flow between the first and second longitudinal channels 90, 92. As illustrated in the perspective view of FIG. 9, each of the top foil 68 and the bump foil 74 may extend substantially along an entirety of the circumference 98 of the inner cylindrical surface 58 and of the outer surface 78 of the rotatable shaft 52.

At least one of the bump foil 74 and a radially extending segment 80 of the top foil 68 is formed contiguous with the inner cylindrical surface 58 of the journal sleeve 56. This is so that the top foil 68, the bump foil 74 or both are made contiguous with the journal sleeve 56. This contiguation between/among the journal sleeve 56 and the top and/or bump foils 68, 74 constrains the foils 68, 74 against rotation with respect to the journal sleeve 56 and avoids the need of providing a key and of forming a slot in the journal sleeve 56. This contiguation may take several forms, as illustrated in the various configurations shown in FIGS. 3-8. (Note that as used herein, and as shown by the cross-hatching used in FIGS. 3-8, a "contiguation" occurs where two or more elements meet, are made of the same material, and are formed as a conjoined structure. Thus, when two or more elements are thusly joined they may be referred to herein as being "contiguous", "contiguated", "formed contiguous" and/or "made contiguous" with each other, and the two or more elements may be said to "contiguate" with each other.)

In a first configuration as shown in FIG. 3, a segment 80 of material may extend radially from the top foil 68 to the inner cylindrical surface 58. Segments 82 of the bump foil 74 may join the radially outward end of the radially extending segment 80 so as to form a contiguation 84 where the segments 80, 82 meet together with the inner cylindrical surface 58 of the journal sleeve 56. In this arrangement, both the bump foil 74 and the radially extending segment 80 of the top foil 68 are formed contiguous with the inner cylindrical surface 58 at the aforementioned contiguation 84. Note that another contiguation 84 is formed where the radially extending segment 80 meets the top foil 68 at the location 86 shown. Also note that while the two segments 82 of the bump foil 74 that contiguate with the radial segment 80 and the journal sleeve 56 are shown as being generally straight so as to form a "V" shape, these segments 82 may alternatively be curved so as to form a "U" shape (similar to a radially outward extending crest 79). (Note that as used herein, and as shown in FIGS. 3-8, a "location 86" refers to a location on the top foil 68 where a contiguation 84 occurs between the top foil 68 and one or more of (i) the radially extending segment 80 and (ii) the bump foil 74 (including a segment 82 of the bump foil 74)).

Figure 4:
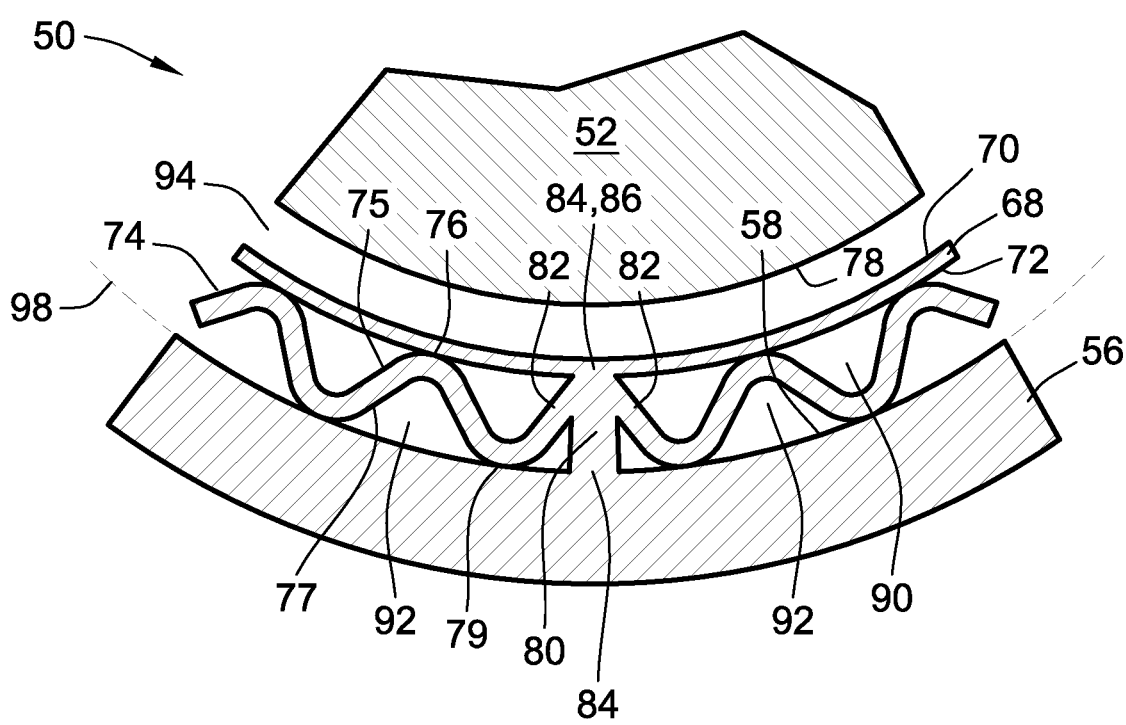
Figure 5:
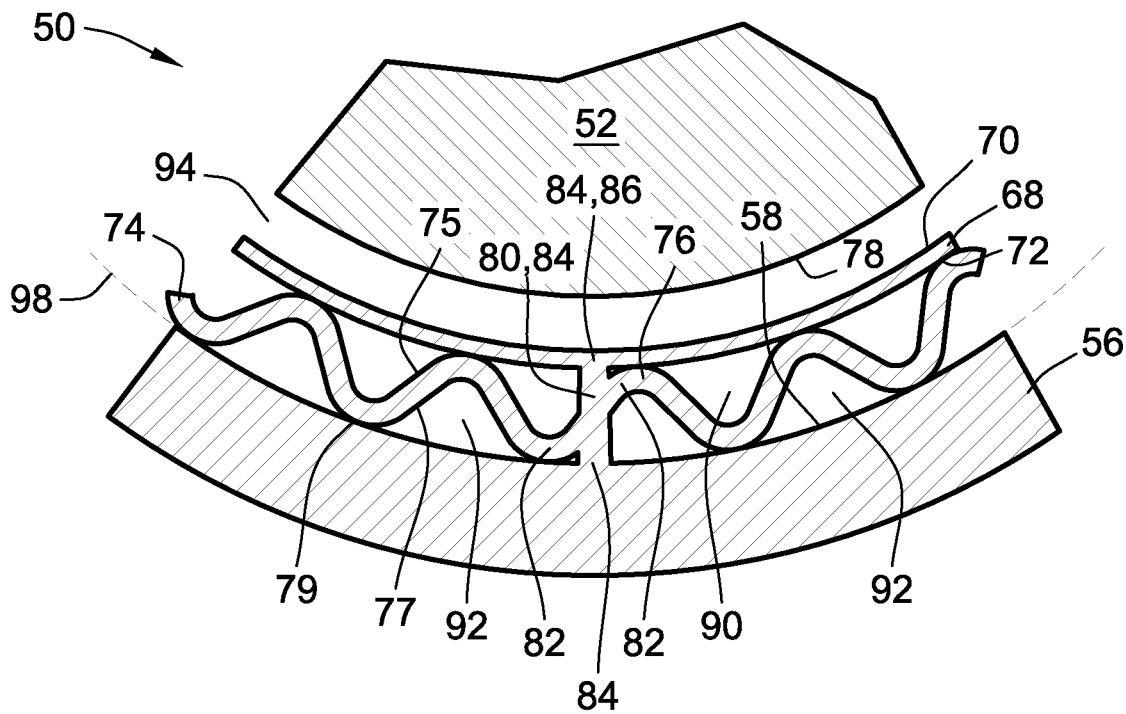
Figure 6:
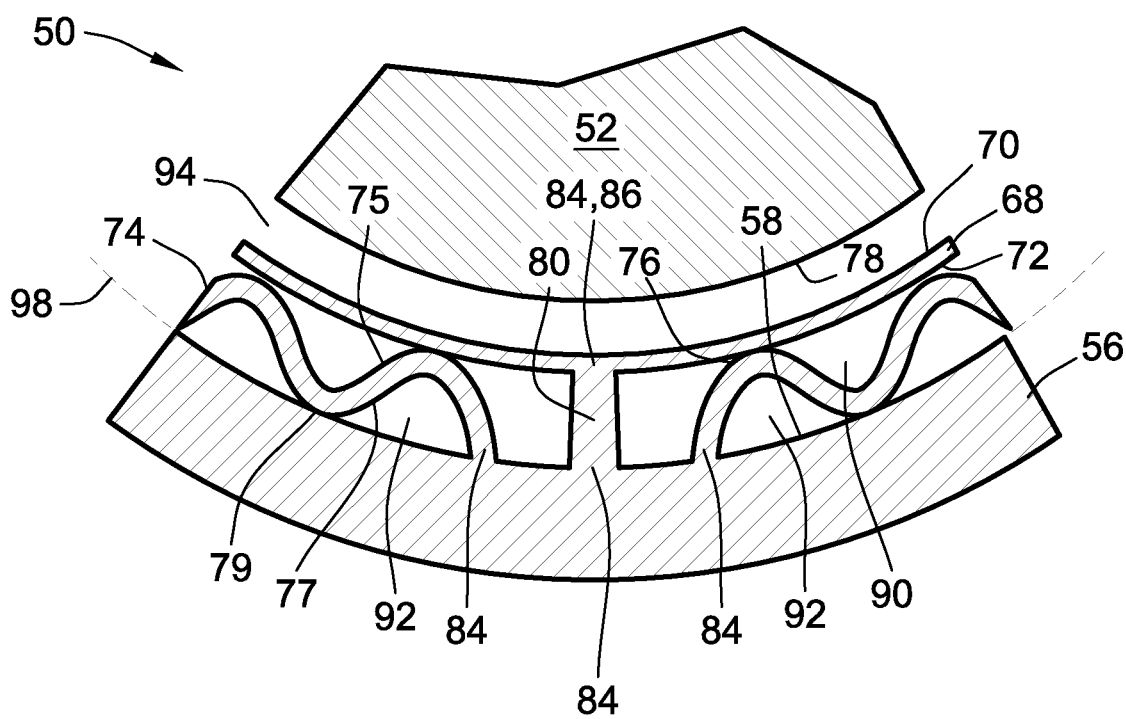
Figure 7:
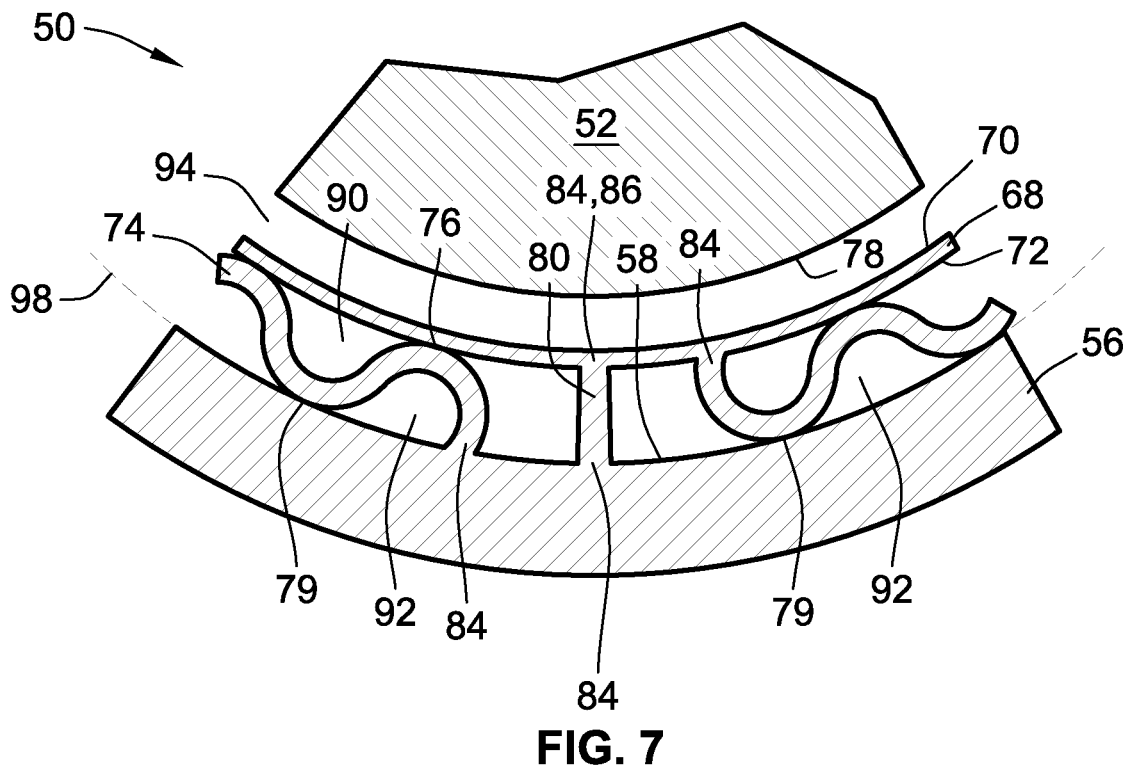
Figure 8:
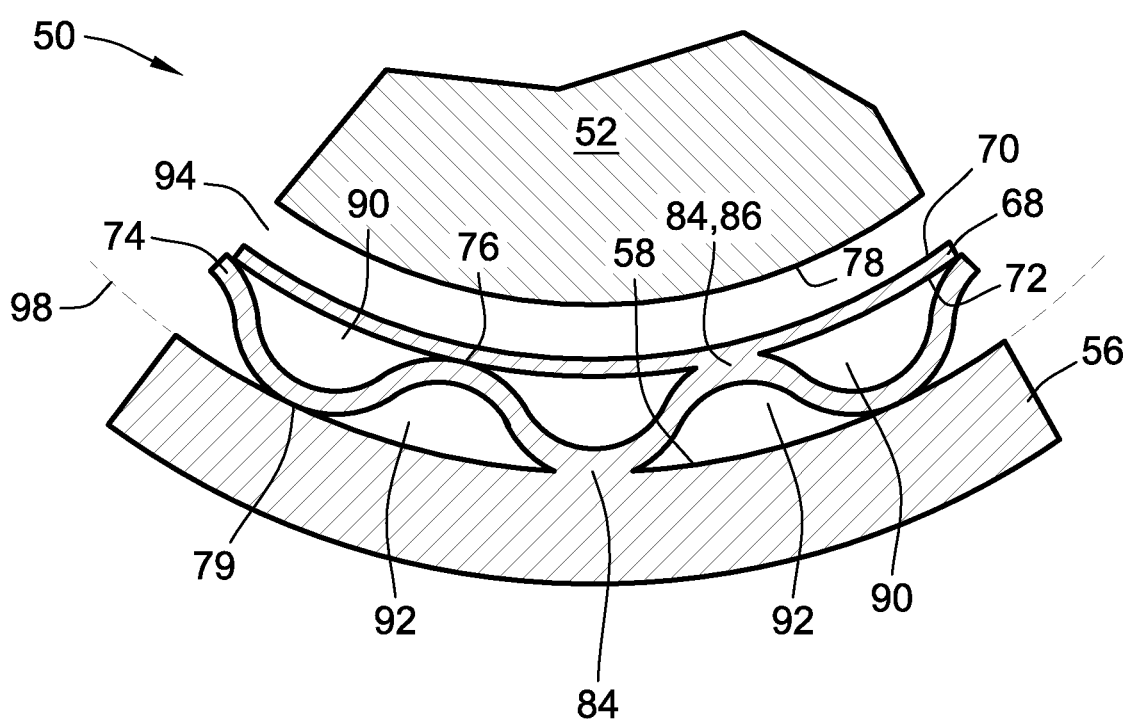

FIG. 4 shows a second configuration that is similar to the first configuration of FIG. 3, except that the bump foil 74 is contiguated with the radially inward end of the radially extending segment 80, instead of being contiguated with the radially outward end of the radially extending segment 80 (and with the inner cylindrical surface 58). FIG. 5 shows a third configuration, in which the bump foil 74 is contiguated with a middle portion of the radially extending segment 80. FIG. 6 shows a fourth configuration, in which the bump foil 75 is not contiguated with the radially extending segment 80, but instead is contiguated at two contiguations 84 directly with the inner cylindrical surface 58. FIG. 7 shows a fifth configuration, in which one end of the bump foil 74 is contiguated with the inner cylindrical surface 58 and the other end of the bump foil 74 is contiguated with the top foil 68 at a location 86 spaced apart from the radially extending segment 80. And FIG. 8 shows a sixth configuration, in which no radially extending segment 80 is used. In this configuration, the bump foil 74 is contiguated with the inner cylindrical surface 58 at a radially outward extending crest 79 and with the top foil 68 at a location 86 at an adjacent radially inward extending crest 76. Many other configurations are possible in addition to the ones shown here. The top foil 68 and bump foil 74 may be contiguous with each other at one or more locations 86 on the top foil 68, and the bump foil 74 may be contiguous with the inner cylindrical surface 58 at one or more locations on the inner cylindrical surface 58 as well.

The journal sleeve 56, the top foil 68 and the bump foil 74 may be formed as a single piece by additive manufacturing (AM), such as by selective laser sintering (SLS) and other 3D printing-related processes. For example, the journal sleeve 56 and foils 68, 74 may be made of selectively sintered ceramic-metal powder. Alternatively, the journal sleeve 56 and foils 68, 74 may be made of or include carbon fiber.

Figure 10:
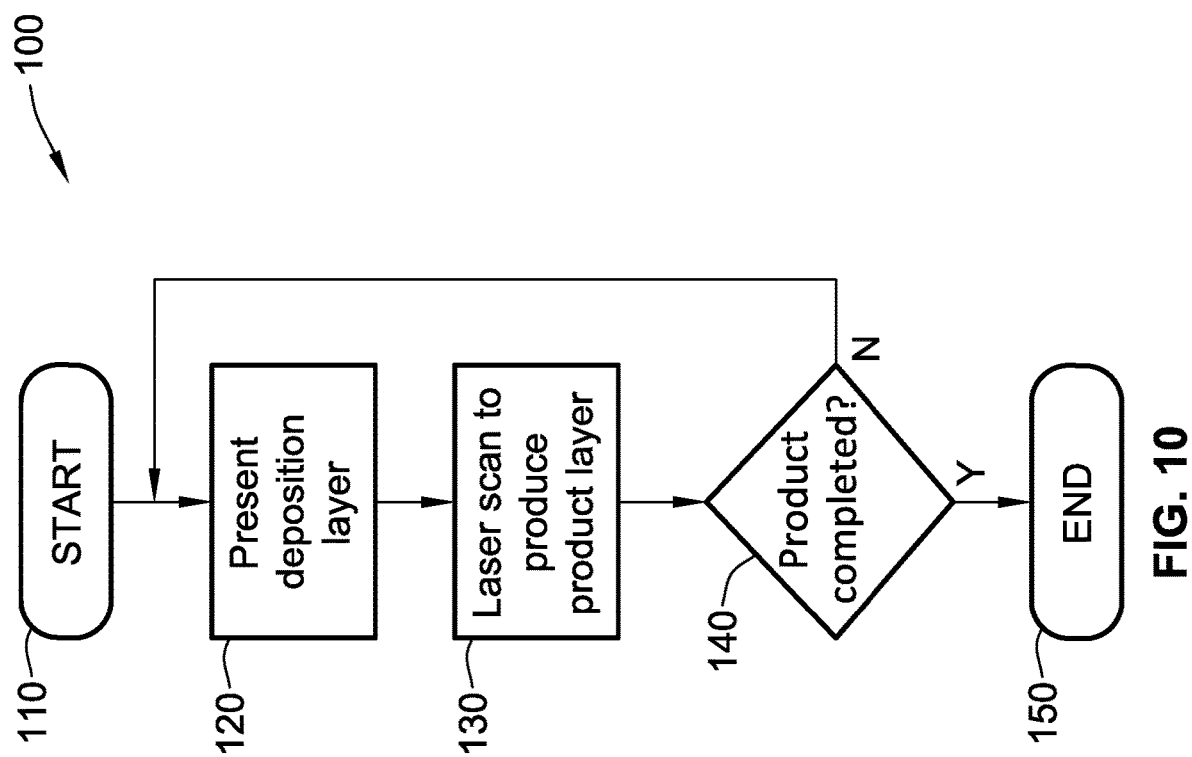
FIG. 10 is a flowchart for a method of manufacturing an air journal bearing.
Figure 11A:
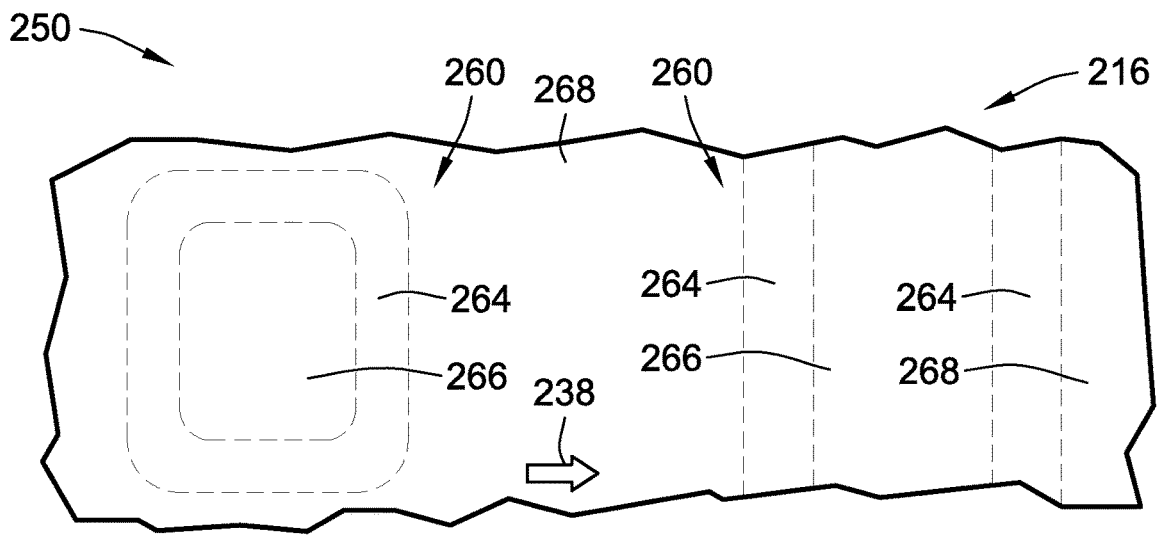
FIG. 11A is a schematic plan view of patterns on a deposition layer of powder for laser scanning.
Figure 11B:
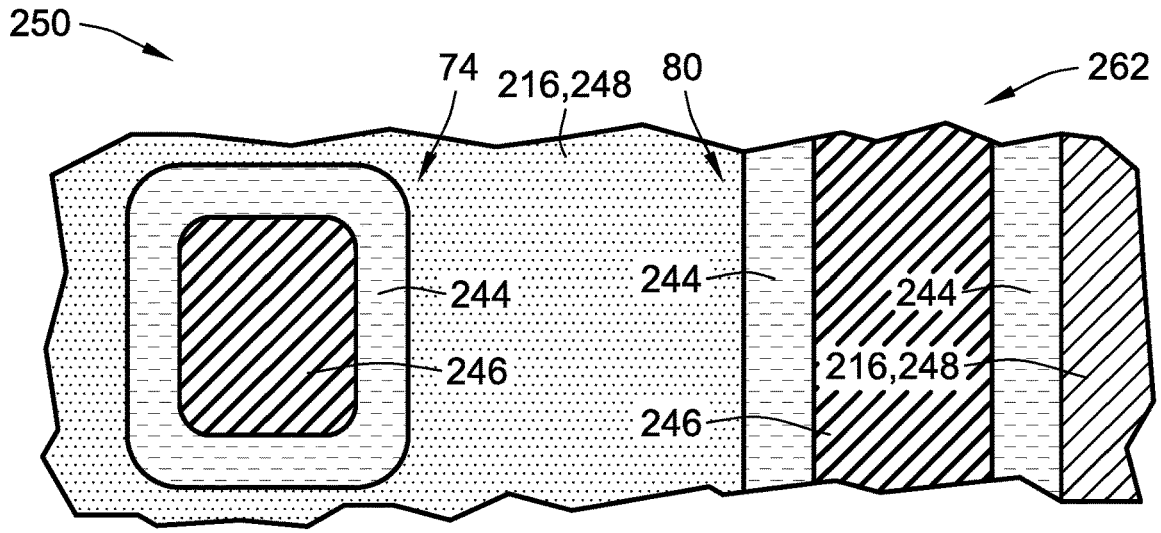
FIG. 11B is a schematic plan view of a product layer produced by selective laser sintering of the patterns of FIG. 11A.
Figure 13:
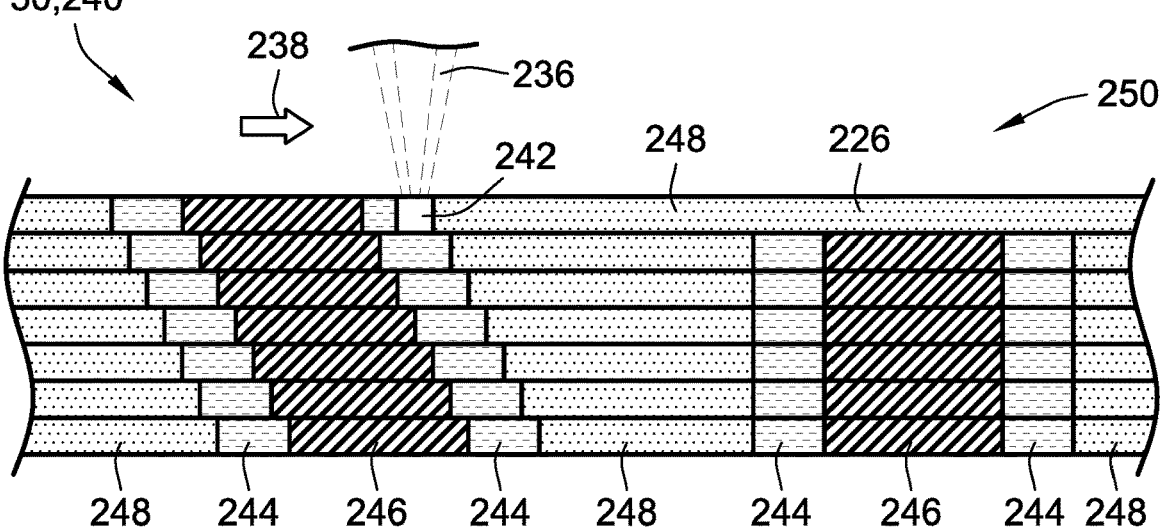
FIG. 13 is a schematic close-up view of the top of the second powder bed of FIG. 12.
Figure 12:
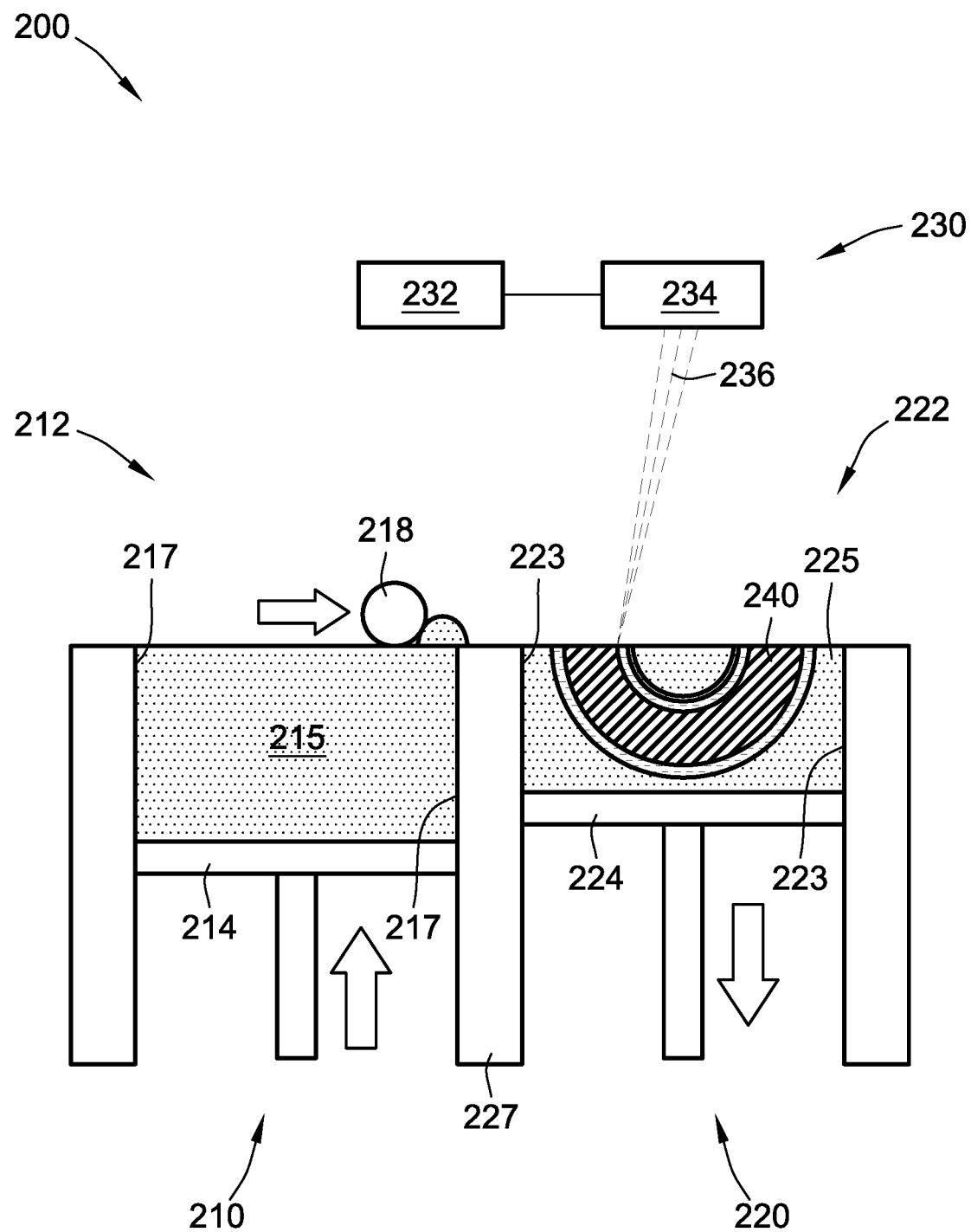
FIG. 12 is a schematic view of a selective laser sintering system for producing air journal bearings.

FIG. 10 shows a flowchart for a method 100 of manufacturing a one-piece air journal bearing 50, 240 in accordance with FIGS. 11-13. The method 100 starts at block 110, and at block 120 a plurality of successive deposition layers 250 of a ceramic-metal powder 216 are presented. The powder 216 comprises a mixture of ceramic powder and metal powder, with the ceramic powder being sinterable by absorption of laser energy at a first wavelength and the metal powder being sinterable by absorption of laser energy at a second, different wavelength. Because the two powders are sinterable at two different wavelengths, a laser system 230 capable of producing the two wavelengths can be used to scan the surface 226 of a powder bed 225 and selectively emit one or the other (or both) of the two wavelengths to selectively sinter the ceramic portion of the powder and/or the metal portion of the powder at the location 242 on the powder bed 225 where the laser beam 236 is focused. (An exemplary SLS system 200 which may be used with the present method 100 is described in more detail below.)

At block 130, after the presenting of each deposition layer 250, a respective pattern 260 is laser scanned onto the deposition layer 250 using a respective combination of the first and second wavelengths, in order to produce a respective product layer 262 of the one-piece air journal bearing 50, 240 made of selectively sintered ceramic and/or metal and corresponding to the respective pattern 260. As the respective product layers 262 accumulate, the one-piece air journal bearing 50, 240 is produced.

FIG. 11A shows a schematic plan view of exemplary patterns 260 on a selected deposition layer 250 of powder 216 for laser scanning. Each deposition layer 250 has its own set of patterns 260 to be laser scanned at one or both of the two wavelengths in order to produce regions of sintered ceramic and/or sintered metal corresponding to the patterns 260. These patterns 260 are not physically present on each deposition layer 250, but are stored in computer memory or the like, and are used for guiding the beam 236 to scan out these patterns 260, and for selecting the wavelengths to be used for portions 264, 266 within each pattern 260. For example, FIG. 11A shows a selected deposition layer 250 having two patterns 260; the left pattern 260 may correspond to a segment 82 of the bump foil and the right pattern 260 may correspond to the radially extending segment 80 of the top foil 68. Here, the left pattern 260 has a first portion 264 (shaped like an elongated annulus) surrounding a second or interior portion 266, while the right pattern 260 has two first portions 264 (shaped like two parallel stripes) surrounding a second or interior portion 266 (shaped like a generally rectangular region). The first portion(s) 264 of each pattern 260 corresponds to where the laser system 230 directs the first wavelength in order to sinter the ceramic powder thereat, and the second portion 266 of each pattern 260 corresponds to where the laser system 230 directs the second wavelength in order to sinter the metallic powder thereat.

As each deposition layer 250 is presented (as described more fully below), the laser beam 236 is directed so as to scan the one or more patterns 260 on that layer 250 using a combination of first and second wavelengths directed at the first and second portions 264, 266, respectively, to produce a product layer 262 having regions 244 of sintered ceramic and regions 246 of sintered metal corresponding to the respective first and second portions 264, 266. FIG. 11B shows a schematic plan view of a product layer 262 produced by selective laser sintering of the patterns 260 of FIG. 11A. As can be seen in the drawings, the first and second portions 264, 266 of the patterns 260 of FIG. 11A correspond to the sintered ceramic and sintered metal regions 244, 246, respectively, of FIG. 11B. Note that third portions 268 of each deposition layer 250 where no laser scanning of either wavelength has occurred correspond to non-sintered regions 248 consisting only of non-sintered powder 216. These non-sintered regions 248 on a given deposition layer 250 may provide support for parts of other deposition layers 250 that are stacked on top of the given deposition layer 250.

Returning to FIG. 10, at block 140 a determination is made whether all of the required deposition layers 250 have been selectively laser scanned to produce all the required product layers 262, thus producing a completed product 50, 240. If not, the process flow is directed to block 120 and the next deposition layer 250 is presented and (at block 130) is scanned to produce the next product layer 262. When the air journal bearing 50, 240 is completed (i.e., all product layers 262 have been completed), the process flow is directed to block 150 where the method 100 ends.

In this method 100, the ceramic-metal powder 216 may also include a buffer powder having a melting point higher than the respective melting points of the ceramic and metal powders. The buffer powder may be a material that does not appreciably absorb either of the first and second wavelengths. One example of such a buffer powder is silica, which has a melting point that is much higher than the sintering and melting points of typical ceramic and metal powders and is not appreciably absorptive of the wavelengths typically used for sintering ceramic and metal powders. When the method 100 is completed, the air journal bearing 50, 240 can be subjected to further processing to remove any non-sintered powder 216, including any non-sintered ceramic powder, non-sintered metal powder and any buffer powder which is not captured within the sintered regions 244, 246.

Utilizing the ceramic-metal powder 216 in an AM/SLS process 100 as described, the journal sleeve 56 and foils 68, 74 may all be made from the same starting material. With selective activation of the first and second wavelengths according to this method 100, a ratio of sintered ceramic to sintered metal per unit volume may vary radially (as well as longitudinally and laterally/circumferentially) for the journal sleeve 56, the top foil 68 and/or the bump foil 74. For example, the journal sleeve 56 may be produced out of essentially all metal, with only the inner cylindrical surface 58 containing ceramic. Alternatively, the bulk of the journal sleeve 56 may be made of a first ratio of ceramic-to-metal, with the inner cylindrical surface and a certain depth radially outward being made of a second ratio of ceramic-to-metal that is higher than the first ratio. Likewise, each of the foils 68, 74 may have a respective center that is more metal than ceramic, and respective outer surfaces that are more ceramic than metal. This ratio of sintered ceramic-to-sintered metal may vary from 0% (i.e., all metal) to 100% (i.e., all ceramic), and may vary radially (and/or longitudinally/circumferentially as well). This essentially permits the air journal bearing 50, 240 to be infused and/or coated with ceramic, which helps increase lubricity and thermal capacity.

FIG. 12 shows a schematic view of an SLS system 200 for producing air journal bearings 50, 240, and FIG. 13 shows a schematic close-up view of the top of the second powder bed 225 of FIG. 12. The system 200 includes a powder delivery system 210, a fabrication system 220 and a laser system 230. The powder delivery system 210 includes a first chamber 212 formed by a powder delivery piston 214 serving as a floor of the chamber 212 and side walls 217. The first chamber 212 is filled with ceramic-metal powder 216 to form a first powder bed 215. Adjacent the powder delivery system 210 is the fabrication system 220, which includes a second chamber 222 located adjacent the first chamber 212. The second chamber 222 is formed by a fabrication piston 224 serving as a floor of the chamber 222 and side walls 223. The second chamber 222 is filled with ceramic-metal powder 216 to form a second powder bed 235. The two chambers 212, 222 may be separated by a common wall 227, thereby permitting one of the side walls 217 of the first chamber 212 to be adjacent to one of the side walls 223 of the second chamber 222.

The laser system 230 includes one or more lasers or laser energy sources 232 operatively connected with one or more scanner systems 234. For example, a single laser 232 capable of producing the first and second wavelengths may be used with a single scanning system 234. Alternatively, one laser 232 capable of producing the first wavelength and another laser 232 capable of producing the second wavelength may be used with a single scanning system 234 configured to operate with both lasers 234, or with two scanning systems 234 wherein each scanning system 234 is dedicated to one or the other of the two lasers 232. The laser(s) 232 and scanning system(s) 234 are configured to direct one or more laser beams 236 at selected locations 242 on the top surface or layer 226 of the second powder bed 225, which is part of the fabrication system 220.

In operation, the powder delivery piston 214 may be raised, thereby lifting the first powder bed 215. In contrast, the fabrication piston 224 may be lowered, thereby lowering the second powder bed 225. A roller or spreader 218 is located at the top of the two chambers 212, 222 and is used to roll or spread an amount of ceramic-metal powder 216 from the first powder bed 215 to the second powder bed 225. This transferred powder 216 then becomes the top deposition layer 226 in the second powder bed 225.

As illustrated in FIG. 13, the laser beam 236 may be directed at a location 242 on the top deposition layer 226 and scanned in a scanning direction 238 (e.g., corresponding to x-y coordinates) to trace out the patterns 260 needed for that layer 226. As described above, the laser system 230 may emit the first wavelength at the current location 242 to produce sintered ceramic or it may emit the second wavelength at the current location to produce sintered metal. For locations 242 on the top deposition layer 226 where neither sintered ceramic nor sintered metal are required, no wavelength is emitted, and such locations 242 may be skipped. However, it is also possible to emit both wavelengths at a location 242 (e.g., by using two separate laser beams 236), thus producing both sintered ceramic and sintered metal at the location 242. In any event, once all the patterns 260 on the top deposition layer 226 are scanned, thus producing the desired regions 244 of sintered ceramic and regions 246 of sintered metal, the fabrication piston 224 may be lowered, the powder delivery piston 214 may be raised, and the roller 218 used to spread or deposit fresh ceramic-metal powder 216 from the first powder bed 215 onto the second powder bed 225, thereby creating the next top deposition layer 226. Note that for illustration purposes, the deposition layers 250 of FIG. 13 correspond to the patterns 260 of FIG. 11A and the product layer 262 of FIG. 11B.

The above description is intended to be illustrative, and not restrictive. While various specific embodiments have been presented, those skilled in the art will recognize that the disclosure can be practiced with various modifications within the spirit and scope of the claims. As used herein, the terms "first", "second", "top", "bottom", etc. are used merely as labels, and are not intended to impose numerical or positional requirements on their objects. Additionally, the phrase "at least one of A and B" and the phrase "A and/or B" should each be understood to mean "only A, only B, or both A and B". And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An air journal bearing for a rotatable shaft of a turbomachine, comprising:
   a journal sleeve having an inner cylindrical surface and a central axis defining longitudinal and radial directions;
   a top foil disposed radially inboard of the journal sleeve and configured to receive the rotatable shaft; and
   a bump foil disposed between the top foil and the journal sleeve and configured to bias at least a portion of the top foil against an outer surface of the rotatable shaft;
   wherein at least one of the bump foil and a radially extending segment of the top foil is formed contiguous with the inner cylindrical surface, and wherein the journal sleeve, the top foil and the bump foil are formed as a single piece by additive manufacturing.

2. An air journal bearing according to claim 1, wherein the additive manufacturing comprises selective laser sintering.

3. An air journal bearing according to claim 1, wherein the journal sleeve, the top foil and the bump foil are made of selectively sintered ceramic-metal powder.

4. An air journal bearing according to claim 1, wherein the journal sleeve, the top foil and the bump foil are made of carbon fiber.

5. An air journal bearing according to claim 1, wherein the top foil is contiguous with the bump foil at at least one location on the top foil.

6. An air journal bearing according to claim 1, wherein the top foil and the bump foil are constrained against rotation with respect to the journal sleeve.

7. An air journal bearing according to claim 1, wherein the top foil and the bump foil define a plurality of first longitudinal channels therebetween and the bump foil and the inner cylindrical surface define a plurality of second longitudinal channels therebetween.

8. An air journal bearing according to claim 7, wherein the bump foil and the radially extending segment of the top foil are formed contiguous with the inner cylindrical surface.

9. An air journal bearing according to claim 1, wherein each of the top foil and the bump foil extends substantially along an entirety of the circumference of the inner cylindrical surface.

10. An air journal bearing for a rotatable shaft of an air handling machine, comprising:
    a journal sleeve having an inner cylindrical surface and a central axis defining longitudinal and radial directions;
    a top foil disposed radially inboard of the journal sleeve and configured to receive the rotatable shaft; and
    a bump foil disposed between the top foil and the journal sleeve and configured to bias at least a portion of the top foil against an outer surface of the rotatable shaft;
    wherein the journal sleeve, the top foil and the bump foil are formed as a single piece made of selectively sintered ceramic-metal powder, and wherein at least one of the bump foil and a radially extending segment of the top foil is formed contiguous with the inner cylindrical surface.

11. An air journal bearing according to claim 10, wherein the top foil is contiguous with the bump foil at at least one location on the top foil.

12. An air journal bearing according to claim 10, wherein the top foil and the bump foil are constrained against rotation with respect to the journal sleeve.

13. An air journal bearing according to claim 10, wherein the top foil and the bump foil define a plurality of first longitudinal channels therebetween and the bump foil and the inner cylindrical surface define a plurality of second longitudinal channels therebetween.

14. An air journal bearing according to claim 13, wherein the bump foil and the radially extending segment of the top foil are formed contiguous with the inner cylindrical surface.

15. An air journal bearing according to claim 10, wherein each of the top foil and the bump foil extends substantially along an entirety of the circumference of the inner cylindrical surface.

16. A method of manufacturing a one-piece air journal bearing for a rotatable shaft of a turbomachine, comprising:
    presenting a plurality of successive deposition layers of a ceramic-metal powder comprising a mixture of ceramic powder and metal powder, wherein the ceramic and metal powders are sinterable by absorption of laser energy at first and second wavelengths, respectively; and
    after the presenting of each deposition layer, laser scanning a respective pattern on each deposition layer, using a respective combination of the first and second wavelengths, to produce a respective product layer of the one-piece air journal bearing made of selectively sintered ceramic and/or selectively sintered metal and corresponding to the respective pattern;
    wherein an accumulation of the respective product layers produces the one-piece air journal bearing comprising:
    a journal sleeve having an inner cylindrical surface;
    a top foil disposed radially inboard of the journal sleeve and configured to receive the rotatable shaft; and
    a bump foil disposed between the top foil and the journal sleeve and configured to bias at least a portion of the top foil against an outer surface of the rotatable shaft;

wherein at least one of the bump foil and a radially extending segment of the top foil is formed contiguous with the inner cylindrical surface.

17. A method of manufacturing according to claim 16, wherein the ceramic-metal powder includes a buffer powder having a melting point higher than respective melting points of the ceramic powder and the metal powder.

18. A method of manufacturing according to claim 16, wherein the laser scanning utilizes the first wavelength at respective first portions of each respective pattern to sinter the ceramic powder thereat and the second wavelength at respective second portions of each respective pattern to sinter the metal powder thereat.

19. A method of manufacturing according to claim 16, wherein a ratio of sintered ceramic to sintered metal per unit volume varies radially for at least one of the journal sleeve, the top foil and the bump foil.

* * * * *